US008784658B2

(12) United States Patent
Hoyland (10) Patent No.: US 8,784,658 B2
(45) Date of Patent: Jul. 22, 2014

(54) WASTEWATER TREATMENT PROCESS AND PLANT COMPRISING CONTROLLING THE DISSOLVED OXYGEN CONCENTRATION

(75) Inventor: Garry Hoyland, Cambridge (GB)

(73) Assignee: Bluewater Bio Technologies Limited, Glen Vine (GB)

( * ) Notice: Subject to any disclaimer, the term of this patent is extended or adjusted under 35 U.S.C. 154(b) by 713 days.

(21) Appl. No.: 12/742,158

(22) PCT Filed: Nov. 14, 2008

(86) PCT No.: PCT/EP2008/065624
§ 371 (c)(1), (2), (4) Date: Jul. 14, 2010

(87) PCT Pub. No.: WO2009/063086
PCT Pub. Date: May 22, 2009

(65) Prior Publication Data
US 2010/0276363 A1    Nov. 4, 2010

(30) Foreign Application Priority Data

Nov. 16, 2007   (GB) .................................. 0722486.8

(51) Int. Cl.
*C02F 3/30*   (2006.01)
*C02F 3/34*   (2006.01)

(52) U.S. Cl.
USPC ........... 210/605; 210/614; 210/615; 210/623; 210/150; 210/259

(58) Field of Classification Search
USPC ......... 210/605, 614, 615, 616, 617, 621, 622, 210/623, 150, 252, 259, 903, 906
See application file for complete search history.

(56) References Cited

U.S. PATENT DOCUMENTS 3,635,346 A * 1/1972 Zuckerman et al. .......... 210/208
3,649,531 A * 3/1972 Brown et al. .................. 210/605

(Continued)

FOREIGN PATENT DOCUMENTS

JP   52-135562   11/1977
JP   58-128190    7/1983

(Continued)

OTHER PUBLICATIONS

Oenhausen, Claudia, "International Search Report", for PCT/EP2008/065624 as mailed Mar. 6, 2009, 2 pages.

(Continued)

*Primary Examiner* — Fred Prince
(74) *Attorney, Agent, or Firm* — Winstead PC (57) ABSTRACT

The present invention relates to a process for treating wastewater that includes the steps of: —a contact step, wherein wastewater contacts bacteria retained on a support surface and the dissolved oxygen concentration of the wastewater is maintained at 2.0 mg/l or less; an aeration step, wherein gas is passed through wastewater that has passed through the contact step and the dissolved oxygen concentration of the wastewater is reduced as the wastewater passes through the aeration step; a sedimentation step, wherein wastewater that has passed through the aeration step is substantially separated into treated water and sludge; and a sludge recycling step, wherein sludge from the sedimentation step is passed to the contact step. The invention also relates to a processing unit on which the aforementioned process may be operated.

22 Claims, 4 Drawing Sheets

(56) References Cited

U.S. PATENT DOCUMENTS

| | | | |
|---|---|---|---|
| 3,728,253 A * | 4/1973 | Kaufman | 210/624 |
| 3,787,316 A * | 1/1974 | Brink et al. | 210/608 |
| 5,582,733 A * | 12/1996 | Desbos et al. | 210/605 |
| 6,039,873 A * | 3/2000 | Stahler | 210/605 |
| 6,689,274 B1 * | 2/2004 | Northrop et al. | 210/601 |
| 6,808,629 B2 * | 10/2004 | Wouters-Wasiak et al. | 210/605 |
| 7,060,181 B2 * | 6/2006 | Fox et al. | 210/167.22 |
| 7,144,509 B2 * | 12/2006 | Boyd et al. | 210/610 |
| 7,452,469 B1 | 11/2008 | Kim | |
| 2007/0029240 A1 * | 2/2007 | Reid | 210/195.3 |

FOREIGN PATENT DOCUMENTS

| | | |
|---|---|---|
| JP | 59-110096 | 7/1984 |
| JP | 02-152595 | 6/1990 |
| JP | 3044819 U | 1/1998 |
| JP | 11-042496 | 2/1999 |
| JP | 2000-51894 A * | 2/2000 |
| JP | 2000-189991 A | 7/2000 |
| JP | 2001-162297 A | 6/2001 |
| JP | 2001-286884 A | 10/2001 |
| JP | 2002-263684 A | 9/2002 |
| JP | 2006-181393 A | 7/2006 |
| JP | 2006-231209 A | 9/2006 |
| JP | 2008-253948 A | 10/2008 |
| KR | 10-0276095 B1 | 12/2000 |

OTHER PUBLICATIONS

Choi, Y.S., et al., "Development for a Biological Process for Livestock Wastewater Treatment Using a Technique for Predominant Outgrowth of Bacillus Species", Jan. 1, 2002, Water Science and Technology, Elmsford, NY, US, pp. 71-78.

In, Jae Park, et al., "Characterization of the Proteolytic Activity of Bacteria Isolated from a Rotating Biological Contactor", The Journal of Microbiology, vol. 41, No. 2, Jun. 2003, pp. 73-77.

Joong, Kyun Kim, et al., "Aerobic Nitrification Denitrification by Heterotrophic Bacillus Strains", Bioresource Technology, vol. 96, No. 17, 2005, pp. 1897-1906.

Kim, Eoung-Ho, et al., "Advanced Wastewater Treatment Technology using Rotating Activated Bacillus Contactor", Japan Science and Technology Agency, vol. 40, 2006-2007, XP009112264, pp. 42-44.

Report of Ministry of Environment, Jul. 31, 2003, Seil Technology Co, Hongik University, Seoul Campus, 72-1 Sangsu-Dong, Mapo-Gu, Seoul 121-791 Korea—Advanced Wastewater Treatment Process Using Rotating Activated Bacillus Contactor (RABC), 17 pages.

Report of Ministry of Environment, Jul. 31, 2008, Korea—Research Consortium DnEco Co.—Development and Application of Compact Advanced Treatment Technology for Concentrated Food Wastewaters, 8 pages.

Published Official design specification drawings for Tongbok STP, Jangdang STP and Hyunduk STP, Mar. 2003, 24 pages.

Letter from Dr. Andrew Pitt to Bluewater Bio Ltd, Apr. 21, 2010, and confirmation of Craig Richard Thomson regarding same, Jul. 20, 2010, 2 pages.

Letter from Indira Clare to Bluewater Bio Ltd, Apr. 21, 2010, and confirmation of Craig Richard Thomson regarding same, Jul. 20, 2010, 2 pages.

Letter from Jo Marriott-Smith to Bluewater Bio Ltd, Apr. 21, 2010, and confirmation of Craig Richard Thomson regarding same, Jul. 20, 2010, 2 pages.

* cited by examiner

WASTEWATER TREATMENT PROCESS AND PLANT COMPRISING CONTROLLING THE DISSOLVED OXYGEN CONCENTRATION

This invention relates to processes for treating wastewater, and to units in which wastewater can be treated.

The impact of mankind on our environment results in the creation of large volumes of contaminated water, which we call wastewater. Wastewater can be liquid waste discharge from domestic and commercial properties, from industry and agriculture, or mixtures thereof. Wastewater sometimes includes suspensions of solids. Sewage is a form of wastewater that includes faecal matter and/or urine.

Wastewater generally contains six principal categories of contaminant, which are as follows:—

(1) Carbonaceous matter (such matter as starch, proteins and lipids) is normally measured in terms of BOD (Biochemical Oxygen demand) and COD (Chemical Oxygen demand), and is a deoxygenating pollutant. Reduced levels of dissolved oxygen caused by the discharge of carbonaceous matter into receiving waters can destroy aerobic life in such waters.

(2) Suspended solids (SS) are all inorganic and organic matter that is not dissolved and processes for removing such solids from wastewaters include filtration or flotation depending on the nature of the solids. Fine or colloidal solids may have to be coagulated by various means before they can be removed. The carbonaceous matter in (1) can be present in wastewater partly as suspended solids and partly as dissolved solids.

(3) Ammoniacal nitrogen which may be present in wastewater as ammonium ions ($NH_4^+$—N) and/or as ammonia ($NH_3$) is a deoxygenating pollutant like carbonaceous matter. Ammonia can also be poisonous to fish present in receiving waters when wastewater are discharged to such wastewaters. Further, ammoniacal nitrogen is a plant nutrient and can cause eutrophication of receiving waters. Most of the ammoniacal nitrogen in wastewaters is usually dissolved.

(4) Total nitrogen (TN) includes all non-molecular forms of nitrogen, which are ammoniacal nitrogen (comprising $NH_4^+$—N and $NH_3$), oxidised nitrogen (comprising nitrite nitrogen ($NO_2^-$—N) and nitrate nitrogen ($NO_3^-$—N)) and organic nitrogen (that is nitrogen contained within organic compounds such as proteins). Ammoniacal nitrogen, nitrite nitrogen and organic nitrogen are deoxygenating pollutants, and all nitrogen compounds are potentially plant nutrients. Most inorganic nitrogen compounds comprising ammoniacal nitrogen and oxidised nitrogen are dissolved, whereas organic nitrogen compounds may be dissolved or suspended.

(5) Total phosphorus (TP) includes all non-molecular forms of phosphorus comprising inorganic and organic phosphates of one type or other. Like TN, TP is a plant nutrient and can result in eutrophication of receiving waters. Compounds containing phosphorus may be dissolved or suspended.

(6) Microorganisms include viruses, bacteria and protozoa some of which are potentially harmful pathogens, particularly when the wastewater is derived from animal and human sources. Bacterial pathogens include certain species of intestinal enterococci generally, and of *Escherichia coli* specifically.

(7) Non-biodegradable matter includes grit, hair, pieces of plastic and inorganic salts. Most of this material is either suspended or floating, and a small amount may be dissolved.

Releasing un-treated wastewater into the aqueous environment can destabilise ecosystems and have an adverse impact on plant and animal health within this environment. Accordingly, a number of processes for treating wastewater have been developed.

The treatment of wastewater involves substantially separating the wastewater from the contaminants which may be collectively produced as a sludge (or by-product) stream requiring treatment and disposal. The whole process of treating the wastewater and sludge results in the partial destruction of the contaminants and their partial conversion to other matter, primarily microorganisms. Water separated out during such treatment can be released into the environment, primarily natural waters. The treated sludge may be recycled (e.g. used as a plant feed in agriculture), and/or destroyed (e.g. in an incinerator).

Conventional biological treatment processes for wastewater are generally multi-step processes, where each step is carried out separately. For example: —a screening step, where large solids and debris may be removed; sedimentation steps, where comparatively small but settleable solids (such as grit and some organic solids) are removed; an aerobic step, where carbonaceous matter is biologically oxidised to carbon dioxide and water and where nitrogen compounds are oxidised primarily to nitrate, possibly with the production of some nitrite; an anoxic step, where nitrates (and nitrites) are reduced to molecular nitrogen (in the absence of oxygen and in the presence of carbonaceous matter); and separation steps, where microorganisms produced in the treatment and other solids are separated from the treated wastewater. Such separation is generally by sedimentation or filtration. For example, conventional activated sludge plants operate by mixing wastewater in oxygenated tanks called aeration tanks with free flowing populations of microorganisms so as to form an oxygenated liquid suspension called 'mixed liquor'. After treatment in the aeration tank, the mixed liquor passes to a sedimentation tank in which the solids suspended in the mixed liquor settle to the tank floor, resulting in treated water forming as supernatant which passes over a weir at the top of the sedimentation tank. The settled solids are removed as sludge through a well in the floor of the tank.

More advanced treatment processes have been developed that involve the use of specific types of microorganisms. Such advanced treatment processes exploit the natural ability of specific types of microorganisms to remove contaminants from wastewaters as well as bring about other benefits such as improved settling characteristics of the solids suspended in the mixed liquor.

For example, Korean patent publication No. 10-0276095 describes a process for treating wastewater that includes a step in which wastewater contacts microorganisms that are retained on a support surface prior to transfer to an aeration tank. The wastewater, flowing through both the contact step and the aeration tank, is oxygenated.

The process described in the Korean patent involves the following treatment steps in the following order: —removal of comparatively large debris suspended or floating in the wastewater; passage of wastewater through a contact tank in which wastewater contacts microorganisms retained on a fixed surface; passage of wastewater through an aeration tank in which a mixed liquor containing wastewater and free flowing microorganisms is oxygenated; passage of wastewater to sedimentation tanks where it is separated into treated water and sludge (which is the sediment); passage of treated wastewater to a discharge. A portion of the sludge is pumped by an excess sludge pump to a sludge concentration tank ready for disposal or further treatment. The remainder of the sludge from the sedimentation tank is recycled directly to the aeration tank. A portion of the wastewater flowing from the aeration tanks is recycled directly to the contact tank.

Compared to the process run on a conventional activated sludge plant, the process described in the Korean patent has been shown to result in a significantly better quality of treated water. However, the present inventors do not consider that such known treatment processes have been optimised in order to most efficiently provide the best quality of treated water.

Accordingly, in a first aspect of the present invention there is provided a process for treating wastewater comprising;—
a. a contact step, wherein wastewater contacts bacteria retained on a support surface and the dissolved oxygen concentration of the wastewater is maintained at 2.0 mg/l or less;
b. an aeration step, wherein gas is passed through wastewater that has passed through the contact step and the dissolved oxygen concentration of the wastewater is reduced as the wastewater passes through the aeration step;
c. a sedimentation step, wherein wastewater that has passed through the aeration step is substantially separated into treated water and sludge; and
d. a sludge recycling step, wherein at least a portion of the sludge from the sedimentation step is passed to the contact step.

Not wishing necessarily to be bound by theory, the inventors propose that one can control the dissolved oxygen concentration in the contact tank such that a portion of the population of bacteria retained on the support surface operates under aerobic conditions, and another portion of the population operates under anaerobic conditions. Such a situation is proposed to optimise the breakdown of wastewater contaminants during the contact step; as aerobic processes of bacteria may breakdown certain contaminants, whilst other contaminants and products of aerobic processes may be broken down by anaerobic bacterial processes.

Further, but not wishing to be bound by theory, the inventors propose that one can influence the composition of the bacterial population in the wastewater flowing freely through the contact step and aeration step by providing in the wastewater passing through both steps with a relatively low dissolved oxygen (DO) concentration, compared with DO concentrations found in wastewater treatment systems generally.

The wastewater is the water fed to the process for processing. Water passing through the various steps of this process is also referred to as wastewater in this description of this invention and may contain inter alia the bacteria used in the process (such wastewater is often referred to in the art as mixed liquor).

The microorganisms in the contact step are primarily retained on the support surface although the process may utilise both the bacteria retained on the support surface and the free-flowing bacteria present in the wastewater. The retention time of the wastewater in the contact step (defined as the volume of the wastewater in the contact step divided by the average flow rate of the wastewater) is preferably in the range 5 minutes to 3 hours depending on the strength of the wastewater.

All or at least a major portion of the microorganism in the aeration step are free-flowing in the mixed liquor but the free-flowing microorganisms may be supplemented by other microorganisms attached to support surfaces that may be fixed in position or free-flowing in the wastewater. The retention time of the wastewater provided by the aeration step (defined as the volume of the mixed liquor in the aeration step divided by the average flow rate of the wastewater) under the conditions wherein the dissolved oxygen (DO) concentration of the mixed liquor conforms to the levels described below is preferably in the range from 4 hours to 1, 2, 3, 4 or more days depending on the strength of the wastewater.

The ratio of the retention time of the wastewater in the aeration step, under the controlled DO concentrations described below, to the retention time of the wastewater in the contact step is preferably in the range 15 to 90.

In one embodiment, the dissolved oxygen concentration during the contact step is maintained at 2 mg/l or less, 1.5 mg/l or less, or 1 mg/l or less, and optionally not less than 0.2 mg/l. Thus, the wastewater in the contact step is preferably aerobic and not anaerobic.

The DO concentration of the wastewater towards the beginning of its passage through the aeration step is comparatively low and lower or even zero concentration towards the end of the liquor's passage through the step. The DO profile in the contact step and through the aeration step selects for the growth and development of endospore forming bacteria. The biological stress towards the end of the aeration step (achieved by lowered DO and/or a concentration of nutrients for the bacteria in the wastewater that is below that required for normal physiological functioning of the bacteria) encourages the sporulation of such bacteria and the biological growth conditions in the contact step encourage the activation and germination of the endospores into vegetative cells that can grow exponentially.

The growth of endospore forming bacteria and the production and germination of endospores is proposed to encourage the maintenance of good levels of functional bacteria, both freely flowing in the mixed liquor throughout the steps of the method and retained on the support surface of the contact step.

Accordingly, it is preferred that the DO concentration of the wastewater towards the beginning of the wastewater's passage through the aeration step and towards the end of its passage through the aeration step is controlled at a level that encourages the growth and development of endospore-forming bacteria and such bacteria to undergo their life-cycle.

Optionally the dissolved oxygen concentration of wastewater towards the beginning of the wastewater's passage through the aeration step is in the range of from 0.5 to 2 mg/l, 0.2 to 1.5 mg/l, 0.5 to 1.5 mg/l, 0.2 to 1.5 mg/l, or 0.5 to 1.0 mg/l.

Optionally the dissolved oxygen concentration of wastewater towards the end of the wastewater's passage through the aeration step is in the range of from 0 to 1.0 mg/l, 0 to 0.5 mg/l, 0 to 0.25 mg/l, 0 to 1.0 mg/l, 0 to 0.1 mg/l or is 0 mg/l.

The wastewater preferably takes at least 4, 6, 8 or 10 hours to pass through the aeration step, and most preferably at least 1, 2, 3, 4 or 5 hours of which must be spent under conditions where the dissolved oxygen concentration of the wastewater conforms to the levels described above for the end of the aeration step.

The dissolved oxygen concentration of wastewater preferably incrementally or continuously reduces as it passes through the aerations step. Thus, the dissolved oxygen concentrations may be stepped down, or may drop gradually, from the beginning to the end of the aeration step, preferably DO is not cycled in time (i.e. intentionally raised, lowered, raised, lowered, etc).

Maintenance of the dissolved oxygen concentrations at the desired values described above can be achieved by control of the supply of oxygen to the wastewater, which may include supply of no oxygen. This is particularly important as the oxygen demand of the wastewater may vary with time, particularly if the carbonaceous and/or Total Nitrogen concentration of the wastewater varies. Thus, the supply of oxygen to the wastewater may be controlled by varying the supply in order to maintain the dissolved oxygen concentrations at the desired values described above (i.e. by increasing or decreasing the oxygen supply to the wastewater).

The skilled person would be aware of the many ways in which one could control oxygen supply to the wastewater flowing through the contact step and/or aeration step. For example, a structure in the contact step may be repeatedly removed from and returned to the wastewater (preferably in a rotational movement), thereby stirring atmospheric oxygen into the wastewater. The structure operated during the contact step may be at least a portion of the support surface. Alternatively, or in addition, oxygen can be bubbled through the wastewater from, for example, a perforated pipe.

Once one establishes how to control oxygen supply to the wastewater, one can then control the dissolved oxygen concentration of the wastewater. Essentially this involves a monitoring step in which the dissolved oxygen concentration of the wastewater is measured and compared against the desired concentration, and a feedback step in which the means of delivering the oxygen to the wastewater is controlled in order to increase or decrease the supply of oxygen so as to arrive at the desired dissolved oxygen concentration discussed above. Optionally, in addition to monitoring dissolved oxygen concentration, redox potential may also be measured in order to control the supply of oxygen.

For example, if the means for supplying the oxygen was a perforated pipe immersed in the wastewater and through which oxygen is bubbled, and the dissolved oxygen concentration was measured to be lower than desired, then the feedback step would have the effect of more oxygen being bubbled from the pipe into the wastewater. Alternatively, or in addition, if the means for supplying oxygen was performed by a structure being repeatedly removed and returned to the wastewater, then the repetition of the step of removal and return of the structure would increase or decrease in frequency.

The process may utilise both bacteria retained on the support surface during the contact step and free-flowing bacteria that may be found in the wastewater in any one or more of the steps of the present invention. Preferably, only free-flowing bacteria are provided in the aeration step (i.e. bacteria are not retained on a support surface as in the contact step).

Bacteria that are suitable for use in the process of the present invention are those that are capable of breaking down molecules comprising nitrogen, carbon, sulphur, chlorine, phosphorous, or any combination thereof, that can be found in wastewater. Bacteria from the phyla Firmicutes (particularly from the *Bacillus* and *Clostridium* genera), Proteobacteria and Bacteroidetes are most effective at the aforementioned breakdown.

Endospore forming bacteria are particularly preferred. Thus, in a preferred embodiment of the present invention the bacteria are from the Bacilli and Clostridia genera. Species of *Bacillus* and *Clostridium* are preferably active in the contact step and species of *Bacillus* are preferably active in the aeration step. Both Bacilli and Clostridia undergo a lifecycle involving growth (multiplication) of cells, conversion of cells to endospores (which occurs when the cells are stressed by, for example, lack of nutrients) activation of the endospores (which occurs when the endospores are re-exposed to nutrients) followed by germination of the endospores and finally outgrowth of new vegetative cells (which occurs under continued exposure to nutrients).

Bacteria from the genus *Bacillus* are considered to be particularly suitable, with the most preferred species comprising *B. subtilis, B. vallismortis, B. amyloliquefaciens, B. licheniformis* and *B. megaterium*, or any combination thereof. Although other *Bacillus* species such as *B. brevis, B. cereus, B. formis, B. thuringiensis, B. polymyx, B. popiolliae, B. stearothermophilus* and *B. sphaericus*; or any combination thereof, are also considered useful for incorporation into the present invention.

Accordingly, all mutants or variants of any of the preferred bacteria discussed above (particularly those that are capable of forming endospores and of breaking down molecules that comprise hydrogen, nitrogen, carbon, sulphur, chlorine and/or phosphorous) would also be suitable for use in the present invention.

Mixed species populations of bacteria may be retained on the support surface and/or free flowing through the process. However, it is preferred that one of the populations of bacteria according to the previous paragraphs, particularly endospore-forming bacteria, predominate.

Under conditions provided in conventional activated sludge plants, competing bacteria outgrow endospore forming bacteria such as Bacilli, which are present in comparatively small concentrations. In contrast, the conditions imposed in each of the steps of the present invention favour the life cycle of endospore forming bacteria. Not wishing necessarily to be bound by theory, it is proposed that endospore forming bacteria are encouraged to germinate and grow under the conditions in the contact step, and to grow then sporulate under the conditions in the aeration step. Such conditions ensure a dominance of endospore-forming bacteria in the process because the low dissolved oxygen concentrations in the step cause other types of bacteria to suffer a decrease in their growth rate and survival rate. It is also proposed that endospores improve the settling characteristics of wastewater in the sedimentation tank so that the treated water contains very low concentrations of suspended solids. Furthermore, endospores are proposed to have a propensity to lodge on (and in) the biomass in the contact tank where they germinate and the resulting population of vegetative cells grows.

The support surface may be any solid phase capable of physically supporting bacteria retained thereon such that the bacteria come into physical contact with wastewater passing through the contact step. The support surface may be one or more fixed bodies, which may be static or capable of movement (e.g. discs provided on a rotating shaft), or one or more body capable of free movement within the contact step (i.e. suspended plastic particles, floating glass or polystyrene spheres). In a particularly preferred embodiment of the present invention, the support surface comprises a number of discs provided on a shaft. The discs may be partially submerged in wastewater and the fraction of the discs submerged may be altered by positioning the height of an outlet weir. Preferably, each disc is submerged to about one third of the disc diameter. Rotatory movement of the discs, which may be caused by rotation of the shaft to which they are attached, may change the position of the portion of the disc that is submerged at any give time. Thus, each part of the disc is alternatively exposed to air and wastewater. Changing the speed of rotation will change the frequency of submersion of a given portion of the disc. Preferably a motor rotates the shaft at a rate of around 4 revs/min so that the each portion of the disc is alternatively exposed to air and the wastewater. In this way, the retained bacteria in the contact tank are aerated, providing the oxygen for the biological Treatment. The speed of rotation can be adjusted in accordance with the rate of treatment required and the required dissolved oxygen concentration in the wastewater passing through the contact step.

The bacteria are preferably retained onto the support surface by forming a biofilm thereon. Preferably, the support surface is made of a substance that promotes the formation of a biofilm (i.e. the material is one to which bacteria can attach to form an integrated biomass that has biological activity within the support surface as well as on the surface of the support surface). It has been found that a support surface made from a reticulated structure is particularly suitable. Preferably the reticulated structure has a void of greater than 60, 70, 80, 90, 91, 92, 93, 94, 95, 96, 97 or 98%, but less than 100%, of the reticulated structure's volume. The support surface may be made of a synthetic polymer that is resistant to biodegradation in wastewater, can support biofilm and can be constructed in the form of a reticulated structure. Examples of suitable synthetic polymers are polypropylene, polyester, polyurethane, polyether-polyurethane, polyvinyl chloride, polyvinylidene chloride and polyvinylidene fluoride, or any combination thereof.

Alternatively, or in addition, an activator composition dosing step can be added to the process, wherein an activator composition that stimulates growth of these bacteria is added to wastewater. The activator composition dosing step may be carried out after, before or simultaneously with any other step of the process, but preferably during the contact step. Suitable activator compositions may comprise silicates and/or magnesium compounds and other trace nutrients, especially those required by endospore-forming bacteria. However, often the wastewater naturally contains adequate levels of activator composition (a fact that can be determined by chemical analysis of the wastewater), in which case an activator composition dosing step is not required.

During the aeration step, gas is passed through the wastewater for two reasons. Firstly, the passage of gas agitates the wastewater and so encourages mixing of its components and maintains a suspension of inter alia the bacteria. Where the supply rate of gas is not sufficient to maintain the bacteria in suspension, the wastewater may be mechanically mixed to maintain the suspension. Secondly, when oxygen is included in the gas, the gas can be used to control the dissolved oxygen concentration of wastewater, this is discussed above (oxygen facilitates breakdown of contaminants in the wastewater and growth of bacteria). Accordingly, the gas preferably comprises oxygen (e.g. air, oxygen enhanced or partially depleted air, or oxygen itself).

Preferably the sludge is recycled directly to the contact step from the sedimentation step during the sediment-recycling step.

Not wishing necessarily to be bound by theory, the inventors proposed that endospores formed in the process of the present invention are returned to the contact step via the recycling step. Recycled endospores may be activated and become embedded in or on the support surface (where they become activated and germinate into vegetative cells) or flow freely through the steps of the process.

Thus, it is proposed that the inclusion of a sludge recycling step enhances the efficacy of the treatment carried out in the contact tank and/or aeration tank; and thereby the overall efficacy of the process as a whole.

Sludge from the sedimentation step, and/or wastewater from all steps, can be passed between the steps and recycled. Recycling may be achieved by passive transport (when gravity urges flow of the wastewater) or by active transport (where pumping or suction moves wastewater or sediment between tanks).

In order to facilitate sedimentation (i.e. separation of liquid from solid) during the sedimentation step, this step is preferably a quiescent step (e.g. no gases are passed through the wastewater during this step, and the wastewater is not mixed).

During the sedimentation step the components of wastewater that are heavier than water sink to the bottom of the tank in which this step is practiced. Water and lighter components of wastewater form a supernatant. Such separation is preferably passively carried out under the influence of gravity. However, separation may additionally or alternatively be carried out by spinning wastewater during the sedimentation step (so that centrifugal forces act on the wastewater) or by urging wastewater through a filter that substantially only water may pass.

The process according to the present invention may further comprise a sludge removal step; wherein sludge from the sedimentation step is removed from the process, for example, to a storage tank or released from the unit in which the process is carried out. Thus, the sludge from the sedimentation tank may be recycled by the sludge-recycling step and/or removed by the sludge removal step.

The sedimentation (or settlement) of the sludge comprising water and solids in the sedimentation tank of the sedementation step causes the sludge to form a 'sludge blanket' in the lower part of the sedimentation tank. This blanket rests above the floor of the sedimentation tank and naturally forms a distinct interface between the blanket and the supernatant above the blanket.

The removal of sludge from the sedementation step by the sludge recycle step and/or the sludge removal step induces a downward convective flow, with a velocity typically in the range from 0.4 m/h to 0.8 m/h, in the lower part of the sedimentation tank. In addition, the sludge solids settle naturally downwards under the urge of gravity, relative to the convective flow, at velocities typically in the range from 0.1 m/h to 0.5 m/h, depending on the settling characteristics of the sludge solids and the operating conditions at the particular time. Owing to both the convective flow and the natural settlement, the gross velocity of the sludge solids is typically in the range 0.5 m/h to 1.3 m/h. The distance that the sludge has to travel may vary typically from 1.0 m to 2 m, depending on the operational conditions at the particular time. Thus, the sludge solids comprising bacteria can reside in the sedimentation tank for typically 1, 2, 3 or 4 hours depending on the factors described above. During this period, the sporulation of the spore forming bacteria continues so that the concentration of endospores in the sludge recycle and in the sludge removal stream is greater than in the mixed liquor entering the separation step. However, the amount of sporulation that occurs in the separation step is variable owing to the variable retention time in the separation step of the sludge solids, which comprise endospores and spore forming bacteria.

In a particular embodiment, the removal of the sludge from the sedimentation tank (via the sludge-recycling step and/or the sludge removal step) is controlled so that bacteria in the sludge are retained in the sludge for a consistent time sufficient to optimise bacterial sporulation. Removal of sludge is controlled by alternating the sludge removal rate from the sedimentation step between a high rate and a low rate. When the sludge removal rate is at the high rate, the amount of sludge temporarily removed in a set unit of time from the sedimentation step is greater than the amount of sludge arriving and settling during the sedimentation step in a set unit of time. Conversely, when the sludge removal rate is at the low rate, the amount of sludge temporarily removed in a unit of time is less than the amount of sludge arriving and settling during the sedimentation step in a set unit of time. Thus, alternating between the two sludge removal rates causes the top level of the sludge blanket in the sedimentation tank to fluctuate. The fluctuating level may be controlled by a step of measuring the depth of the sludge blanket and comparing this with a desired depth, and a feedback step in which the sludge removal rate is increased or decreased to arrive at the desired depth. It should be noted that depth of sludge blanket is a function of the time sludge spends in the sedimentation step.

For example, two sludge blanket interface probes placed at two different levels within the sedimentation tank, say, at heights of 1.5 m and 1.75 m above the base of the wall (typically, the total height of the wall is 3.0 m to 3.5 m) may be used to monitor blanket depth. When the high probe detects the sludge blanket interface, the feedback results in the sludge removal rate from the sedimentation tank changing from the low rate to the high rate. When the lower probe detects the sludge blanket interface, the feedback results in the sludge removal rate changes from a high rate to the low rate. In this way, the retention time of the sludge solids can be stabilised at about 3 hours and the degree of sporulation optimised.

Removal of sludge can be controlled such that the downward convective velocity of the sludge inside the sedimentation step, is typically in the range of from 0.2 m/h to 1.0 m/h. In addition, the solids' free settling velocity in a downward direction within the sludge inside the sedimentation step is typically in the range of from 0.1 m/h to 0.5 m/h depending on the settling characteristics of the sludge and the operating conditions. Thus, the total downward velocity of the sludge solids within the sludge blanket inside the sedimentation step can be controlled to a typical range of from 0.3 m/h to 1.5 m/h. Retention time of the sludge in the sludge blanket within the sedimentation step can therefore be controlled within the range of from 1 hour to 3 hours, which increases the degree of sporulation of the preferred bacteria.

Alternatively, the sludge may be removed from the sedimentation step during the sludge recycle step and passed through a separate sporulation step. Preferably, the sludge is retained in the sporulation step for from 1 hour to 3 hours. The sludge preferably passes through the sporulation tank in plug flow so that all the sludge is retained for a similar period. The plug-flow hydrodynamic conditions may be obtained by constructing baffles in the tank to provide serpentine flow either in the horizontal plane or the vertical plane. The sporulation tank may be aerated but the concentration of dissolved oxygen in the sludge passing through the tank should preferably not exceed 0.3 mg/l to obtain the necessary sporulation.

The wastewater subjected to the aeration step has passed through the contact step, and the wastewater subjected to the sedimentation step has passed through the aeration step. Preferably the wastewater is passed directly between these steps, however, further intermediary and additional steps are envisaged. For example, any combination of the following:—
- an equalisation step may precede the contact step, in which wastewater is held and released at a substantially constant flow rate to the contact step. Any one or more of the recycling steps described herein may also recycle sludge or wastewater to the equalisation step.
- a treated water removal step, wherein the supernatant formed during the sedimentation step is removed;
- a wastewater recycling step, wherein outflow of wastewater from the aeration step is recycled to the contact step;
- a further wastewater recycling step, wherein outflow of wastewater from the aeration step is recycled to the aeration step;
- a further sludge recycling step, wherein sludge is re-cycled to the aeration step;
- a screening step, wherein wastewater is sieved in order to remove solids (e.g. the wastewater preferably passes through a mesh with a gauge range of less than about 10 mm prior to the contact step);
- a degritting step, wherein wastewater passes through a sedimentation tank which removes grit and other particles that readily settle from the wastewater;
- a microfiltration step, wherein treated water from the sedimentation step passes through one or more filters and/or tanks to further improve the quality of the treated water; and/or
- a disinfectant step, wherein treated water is disinfected by, for example, being dosed with chlorine or a similar disinfecting substance, or by radiating with ultra-violet light.

It is further envisaged that supplementary performance enhancing methods may be incorporated into the invention as a means of improving overall performance, even though the performance provided by the invention is sufficient for most applications involving the removal from wastewater of carbonaceous matter with and without the removal of Total Nitrogen and/or Total Phosphorus. However, performance may need to be enhanced where an exceptional performance is required and this may be done by adding onto the invention further treatment steps known to the skilled person.

For example, the removal from the wastewater of Total Nitrogen and/or the reduced forms of nitrogen (mainly ammoniacal nitrogen and/or organic nitrogen) may be increased by incorporating a supplementary aeration step between the aeration step (involving the control of DO concentration as described previously) and the separation step so that the wastewater flows from the aeration step, through the supplementary aeration step into the separation step. The purpose of the supplementary aeration step is to increase the degree of biological nitrification (conversion to reduced forms of nitrogen to nitrate nitrogen) and for this purpose the optimum DO concentration in the wastewater within the supplementary aeration step would be around 2 mg/l. If the objective is to increase further the degree of nitrification provided by the invention, then the wastewater recycle is taken from the outlet of the aeration step, as previously described in the invention. If the objective is to increase the removal of TN provided by the invention then the wastewater recycle may be taken from the outlet from the supplementary aeration step so that the nitrate recycled in the wastewater can be denitrified (to molecular nitrogen) in the contact step and/or the aeration step. Alternatively, a separate denitrification step may be located immediately downstream of the supplementary aeration step to reduce the nitrate in the wastewater to molecular nitrogen. The supplementary aeration step and/or any separate denitrification step may contain fixed or suspended support structures for the bacteria to enhance the performance of these steps.

In another example, the removal from the wastewater of Total Phosphorus may be increased by dosing chemicals into the steps to precipitate the required amount of phosphorus as an insoluble phosphate. Such chemicals include the salts of iron and aluminium (usually the chloride or sulphate). The chemical can be dosed in the contact step or the aeration step. The precipitated phosphate leaves the treatment system which is the invention in the sludge removal step and may be treated and disposed off with the sludge.

In a further aspect of the present invention, there is provided a unit for treating wastewater, wherein the unit comprises:—
- (a) a contact tank, which includes a support surface on which bacteria are retained and that is positioned so as to come into contact with wastewater retained in the contact tank;

(b) an aeration tank that includes means for passing gas through wastewater retained within the aeration tank;
(c) a conduit provided between the contact tank and aeration tank and through which wastewater can pass from the contact tank to the aeration tank;
(d) a sedimentation tank;
(e) a conduit provided between the aeration tank and the sedimentation tank and through which wastewater can pass from the aeration tank to the sedimentation tank;
(f) a conduit provided between the sedimentation tank and the contact tank and through which sediment can pass from the sedimentation tank to the contact tank; and
(g) a wastewater dissolved oxygen concentration control means capable of maintaining the dissolved concentration of wastewater retained in the contact tank at 2.0 mg/l or less and capable of reducing the dissolved oxygen concentration of wastewater as it passes through the aeration tank or tanks.

In a preferred embodiment of the present invention the process according to the first aspect is capable of being practiced on the unit according to the second aspect of the present invention. Thus, inter alia the bacteria, gas and support surface according to the first and second aspects of the present invention are preferably the same. Furthermore the conditions of inter alia dissolved oxygen concentration, time for wastewater's passage through the contact and/or aeration step, time for sludges' passage through the sedimentation step and control and feedback means thereof, as discussed with reference to the first aspect of the present invention are the same as those conditions in the relevant tank with respect to the second aspect of the present invention (i.e. conditions in contact step are the same in the contact tank).

The support surface may be attached to the contact tank, preferably inside the contact tank.

The wastewater dissolved concentration control means preferably comprises a dissolved oxygen concentration measuring means and an oxygen supply control means. The dissolved oxygen concentration measurement means can be any device known to the skilled person capable of measuring the dissolved oxygen concentration of wastewater and comparing this to desired levels. The measuring means are provided in association with the contact and/or aeration tanks in order that they may sample and measure the wastewater retained therein. The oxygen supply control means may, for example, be a structure that is repeatedly removed from then returned to the wastewater (preferably in a rotational movement). Particularly preferred examples of such a structure are discussed earlier in this application with reference to disks provided on a rotating shaft. Alternatively, or in addition, the oxygen supply control means may be a perforated pipe immersed in the wastewater into which oxygen is bubbled. The wastewater dissolved concentration control means may further comprise a functional connection between the measuring means and the supply control means wherein the amount of oxygen supplied by the supply control means is determined by variation of the dissolved oxygen concentration of the wastewater from the required dissolved oxygen concentration as determined by the measurement means. Control of oxygen supply may also be fixed by setting the number of operational aeration devices provided in a given area of the aeration tank(s).

Alternatively, or in addition, a redox potential measuring means may be used in the place of, or in association with, the dissolved oxygen concentration measuring means in order to control oxygen supply.

The means for passing gas through the wastewater can be achieved in a number of ways. For example, the aeration tank could include a pipe that includes a number of holes along its length through which gas within the pipe can pass, or a grid may be included in a portion of the aeration tank floor through which gas is released into the aeration tank. The means for passing gas may also operate as the oxygen supply control means.

The unit of the present invention may include more than one contact tank, aeration tank, and/or sedimentation tank. In a preferred embodiment, the present invention comprises more than one aeration tank, most preferably four aeration tanks. When multiple aeration tanks are used, they may be arranged in series, such that wastewater treated in the unit passes through all aeration tanks. Such an arrangement enables the oxygen concentration in any particular tanks to be controlled so as not to be greater than that of the preceding aeration tanks. In a particularly preferred embodiment, the wastewater dissolved oxygen concentration control means is set to control the dissolved oxygen concentration in the first aeration tank at a higher concentration than in the last aeration tank in the series. The aeration tank may not be aerated and may be mechanically mixed to maintain bacteria in suspension.

Preferably, the conduit provided between the sedimentation tank and the contact tank passes sludge directly from the sedimentation tank to the contact tank.

Preferably, a conduit is provided between the aeration tank and the contact tank and passes wastewater directly from the aeration tank to the contact tank.

The conduits of the present invention are preferably pipes. When a tank is provided at a higher position relative to the next tank in the unit, liquid will flow under gravity from the first to the second tank. Therefore, in a preferred embodiment, two or more adjacent tanks are arranged in a height position relative to each other to enable the required direction of flow of wastewater, sludge or treated water. Accordingly, it is preferred that: —(i) the contact tank is provided at a higher position relative to the aeration tank; and/or (ii) the aeration tank is provided at a higher position relative to the sedimentation tank. Alternatively, or additionally, pumping means may be included in the unit that drives or pulls wastewater between tanks.

In an embodiment of the present invention, the sedimentation tank may include sludge blanket probes. At least two sludge blanket probes may be provided in the sedimentation tank and displaced within the tank at a different height relative to each other from the base of the tank (e.g. one 1.5 m from the base of the tank, the other 1.75 m from the base of the tank).

Preferably, when the higher of the probes detects the sludge blanket, the feedback results in the sludge removal rate from the sedimentation tank changing from the low rate to the high rate. When the lower of the probes detect supernatant (containing comparatively few suspended solids), the feedback results in the sludge removal rate changing from a high rate to the low rate.

In order to facilitate sedimentation in the sedimentation tank, the tank preferably does not include any means for passing gas. The sedimentation tank may include a treated water removal means; preferably such means comprise a weir, over which the supernatant comprising treated water present in the sedimentation tank may flow.

The unit may further comprise a sludge removal conduit that enables sludge in the sedimentation tank to be removed there-through. The sludge removal conduit may be connected to a sludge storage tank, or provided with an exit out of the unit. Thus, the sludge from the sedimentation tank may be recycled through a conduit provided between the sedimentation tank and the contact tank, and/or removed through the sludge removal conduit.

The wastewater that passes into the aeration tank has passed through the contact tank, and the wastewater that passes through the sedimentation tank has passed through the aeration tank. Preferably the wastewater is passed directly between these tanks, however, further intermediary and additional tanks and conduits are envisaged. For example:—

- an equalisation tank may precede the contact step, in which wastewater is held and released at a substantially constant flow rate to the contact tank. Conduits may be provided to enable one or more of the recycling steps described herein to recycle sludge or wastewater to the equalisation tank.
- a conduit provided between the aeration tank and the contact tank through which wastewater flowing from the aeration tank passes to the contact tank;
- a conduit provided between the sedimentation tank and the aeration tank through which sludge collected in the sedimentation tank passes to the aeration tank;
- a large gauge mesh provided across flow of wastewater prior to the contact tank; and/or
- a microfiltration membrane provided across the flow of treated water from the sedimentation tank.

In a preferred embodiment of the present invention the process according to the first aspect of the present invention is carried out on the unit according to the second aspect.

In a further aspect of the present invention there is provided a process hereinbefore described and with reference to the drawings.

In yet a further aspect of the present invention there is provided a unit hereinbefore described and with reference to the drawings.

The present invention will now be described, by way of example, with reference to the accompanying figures, in which:—

1 DESCRIPTION OF EXPERIMENTS

The invention has been tested by our engineering team by constructing a full scale wastewater treatment plant at an abattoir. The abattoir had an earlier wastewater treatment plant based on the conventional activated sludge process (see the conventional biological treatment process described in the pre-amble of this document), but the plant became overloaded and could not produce a compliant effluent. Various tanks from the earlier plant, including the aeration tanks, were incorporated into the new plant.

The following describes the new plant and the performance obtained in a survey. The performance obtained was exceptional, demonstrating the high efficacy of the treatment as described by this invention.

1.1 Design Requirements

Table 1 below gives the values of the wastewater flow rate and pollution loads used in the design of the new wastewater treatment plant for the abattoir. The values of the flow and loads were determined from measurements made at site. The concentrations given in the right-hand column of the table are calculated values, determined by dividing the maximum loads by the maximum daily average flow rate.

TABLE 1

Design Criteria for Abattoir Wastewater Treatment Plant

| Parameter | Maximum flow rate (m³/day) | Maximum daily average load (kg/day) | Maximum concentration (mg/l) |
|---|---|---|---|
| Daily average flow rate | 900 | — | — |
| Hourly average flow rate | 1 300 | — | — |
| $BOD_5 | — | 1 700 | 1885 |
| Suspended solids (SS) | — | 1 670 | 1854 |
| Total Nitrogen (TN) | — | 219 | 243 |
| Total Phosphorus (TP) | — | 32 | 35 |

Note:
$BOD_5 denotes 5-day BOD ATU suppressed.

The four load/concentration parameters in Table 1 are key descriptors of pollution, as described previously in the description of this invention.

As a means of characterising the abattoir wastewater, Table 2 compares properties of the wastewater with those of domestic sewage. The comparison shows that the abattoir wastewater is several times more concentrated than domestic sewage but contains proportionally less nitrogen (TN) and phosphorus (TP).

TABLE 2

Characterisation of Abattoir Wastewater

| Characteristic | Unit | Abattoir wastewater | Domestic sewage |
|---|---|---|---|
| $BOD_5$ | mg//l | 1885 | 200 to 400 |
| BOD/TN | dimensionless | 7.7 | 5.0 to 6.0 |
| BOD/TP | dimensionless | 54 | 20 to 30 |

Table 3 defines the quality standard for the treated effluent, giving the maximum concentration for each parameter. The table also gives the required percentage removals for the various parameters calculated from their concentrations in the wastewater (Table 1) and in the treated effluent (Table 3). The criteria in Table 3 indicate a stringent standard, requiring a high level of treatment to obtain compliance.

TABLE 3

Required Criteria for Quality Standard of Treated Effluent

| Parameter | Maximum concentration in samples of treated effluent (mg/l) | Removal (%) |
|---|---|---|
| $BOD_5$ | 20 | 98.9 |
| TN | 20 | 91.7 |
| TP | 5 | 85.6 |

1.2 Configuration of Treatment Plant

Figure 1:
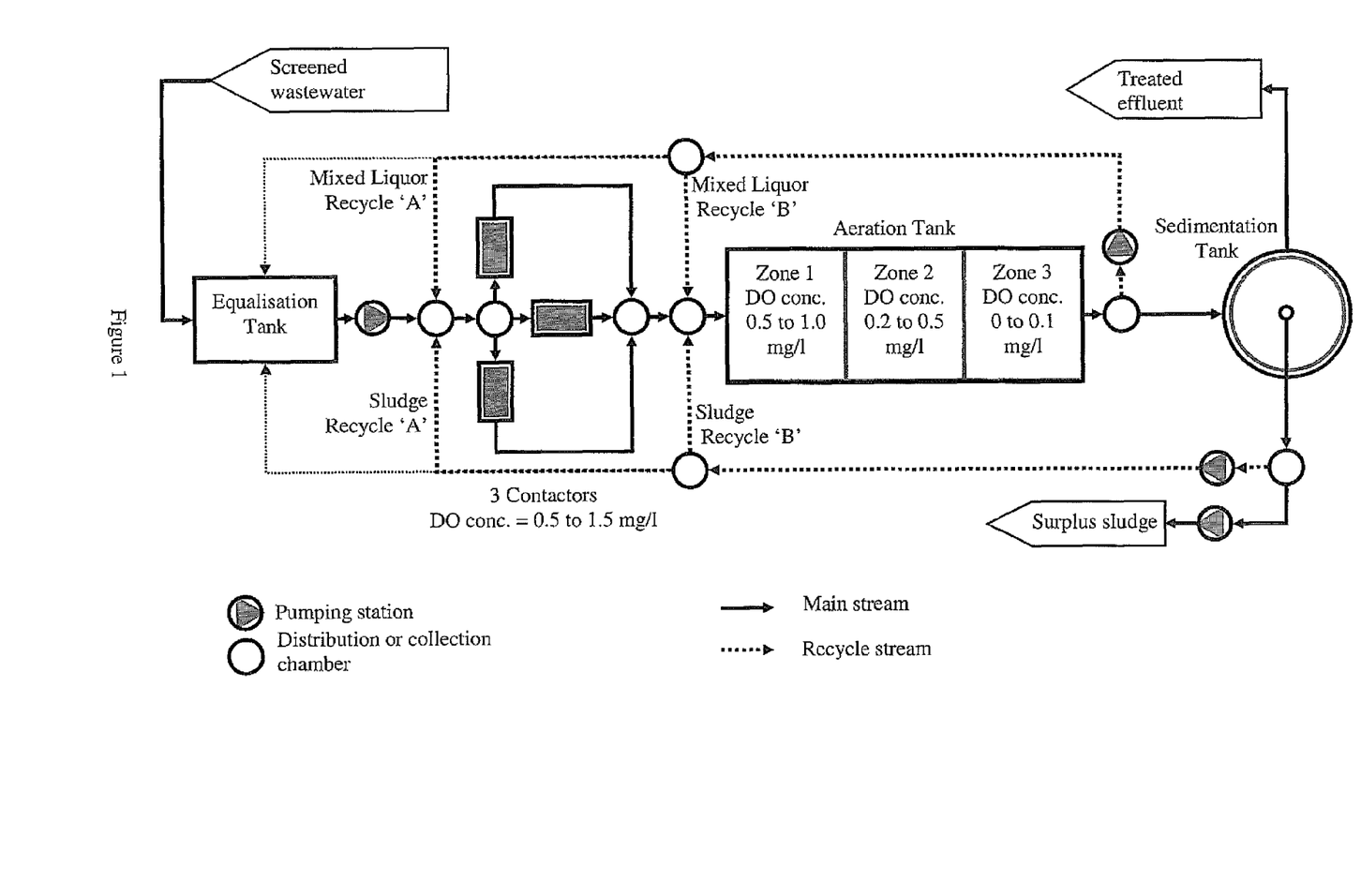
FIG. 1 shows a flow diagram of a wastewater treatment plant according to the present invention.

FIG. 1 is a plan diagram of the treatment plant. The plant comprises screens (not shown), an equalisation tank, three contact tanks (each containing a contactor), an aeration tank effectively separated into three serial zones, and a sedimentation step comprising a sedimentation tank. The surplus sludge produced by the treatment works is thickened in a gravity thickener (not shown) and then dewatered into a cake using a centrifuge (not shown) before disposal at a landfill site. The screening of the wastewater and the thickening and dewatering of the sludge are technologies that are familiar to the skilled person.

1.2.1 Design Criteria

The equalisation tank has a volume of 878 m³ which is equivalent to a retention time of approximately 24 hours at design value of the maximum daily average flow rate. The purpose of the equalisation tank is to buffer the wastewater flow from the abattoir so that the treatment plant receives wastewater continuously and roughly at a constant rate through the day and (as far as possible) from day to day. The wastewater in the tank is mixed to prevent sedimentation of solids from the wastewater onto the tank floor.

The contact step comprises three rotating contactors which, in this application, were installed in three separate contact tanks. In general, several contactors may be installed in a single tank. Each contactor in the application under consideration has a capacity to remove a maximum of 300 kg $BOD_5$/day. Further, the contact step was designed to remove 50% of the $BOD_5$ load in the wastewater, with the aeration tank handling the remainder of the load. The installation of three contactors gave a small safety factor of 6%.

Each rotating contactor comprises a shaft supporting thirty discs manufactured from the type of mesh previously described, the mesh having a porosity of approximately 94%. The discs are approximately 2 m diameter by 50 mm thick and have a centre to centre longitudinal separation of 100 mm. The dimensions of each contact tank are approximately 4.5 m by 2.5 m on plan by approximately 2.5 m high.

Originally part of the earlier treatment plant, the aeration tank has a total capacity of 990 m³, giving a retention time of 26.4 hours at the design value of the daily average wastewater flow rate. The aeration tank is effectively separated into three serial zones of similar size. All three zones are aerated and the last zone is additionally mechanically mixed to maintain the suspension of the bacteria in the mixed liquor. The aeration and mixing technologies are conventional and would be familiar to the skilled person.

The sedimentation tank has a diameter of 11 m, giving an upward velocity of 0.57 m/h at the design value of the maximum hourly-average wastewater flow rate. The conventionally-designed tank has a wall depth of 3.5 m and is fitted with a mechanical scraper.

As shown in FIG. 1, the treatment plant has four recycle streams called: Sludge Recycle 'A', Sludge Recycle 'B', Mixed Liquor Recycle 'A' and Mixed Liquor Recycle 'B'. Total flow rate of the two recycle sludge streams and the two mixed liquor recycle streams is 1 300 m³/day, giving a total recycled flow rate of 2 600 m³/day. A portion or all of the two 'A' recycle streams may be directed to the equalisation tank or to the chamber immediately downstream of the equalisation tank. Directing some of the recycle into the equalisation tank has the advantage of eliminating odour produced by the wastewater in this tank but has no detrimental effect on the treatment efficacy. The operational values of the four recycle flow rates are given in the next section.

1.2.2 Operational Criteria

Table 4 summarises the main operational criteria for the treatment plant. This particular treatment plant does not have automatic control of the DO concentrations in the zones of the aeration tank and in the contact tanks. Instead, the air supply to the aeration tank zones is adjusted manually from time to time with the objective of keeping the DO concentrations within the ranges specified in the table. Similarly, the DO concentrations in the contact tanks are controlled by adjusting the speeds of the rotors.

The mixed liquor suspended solids concentrations given in the table are controlled by regulating the flow rate of the surplus sludge, which is the method used conventionally on activated sludge plants.

TABLE 4

Operational Criteria

| Operational criterion | Unit | Value |
|---|---|---|
| DO concentration in contact tanks | mg/l | 0.5 to 1.5 |
| DO concentration in Zone 1 of aeration tank | mg/l | 0.5 to 1.0 |
| DO concentration in Zone 2 of aeration tank | mg/l | 0.2 to 0.5 |
| DO concentration in Zone 3 of aeration tank | mg/l | 0 to 0.1 |
| Flow rate of sludge recycle 'A' | m³/day | 650 |
| Flow rate of sludge recycle 'B' | m³/day | 650 |
| Flow rate of mixed liquor recycle 'A' | m³/day | 650 |
| Flow rate of mixed liquor recycle 'B' | m³/day | 650 |
| Mixed liquor SS concentration in contact tanks | mg/l | 4 375 |
| Mixed liquor SS concentration in aeration tank | mg/l | 5 500 |

1.3 Performance of Plant

A survey of the performance of the treatment plant was undertaken over a two-month period to measure the removals of the key pollution descriptors. Throughout the survey period, the plant was operating under full load both hydraulically and organically. The results of the survey are given in FIGS. 2 to 4. Each point on these figures is an average for the relevant week, determined by averaging several individual results relating to different days during the particular week.

Figure 2:
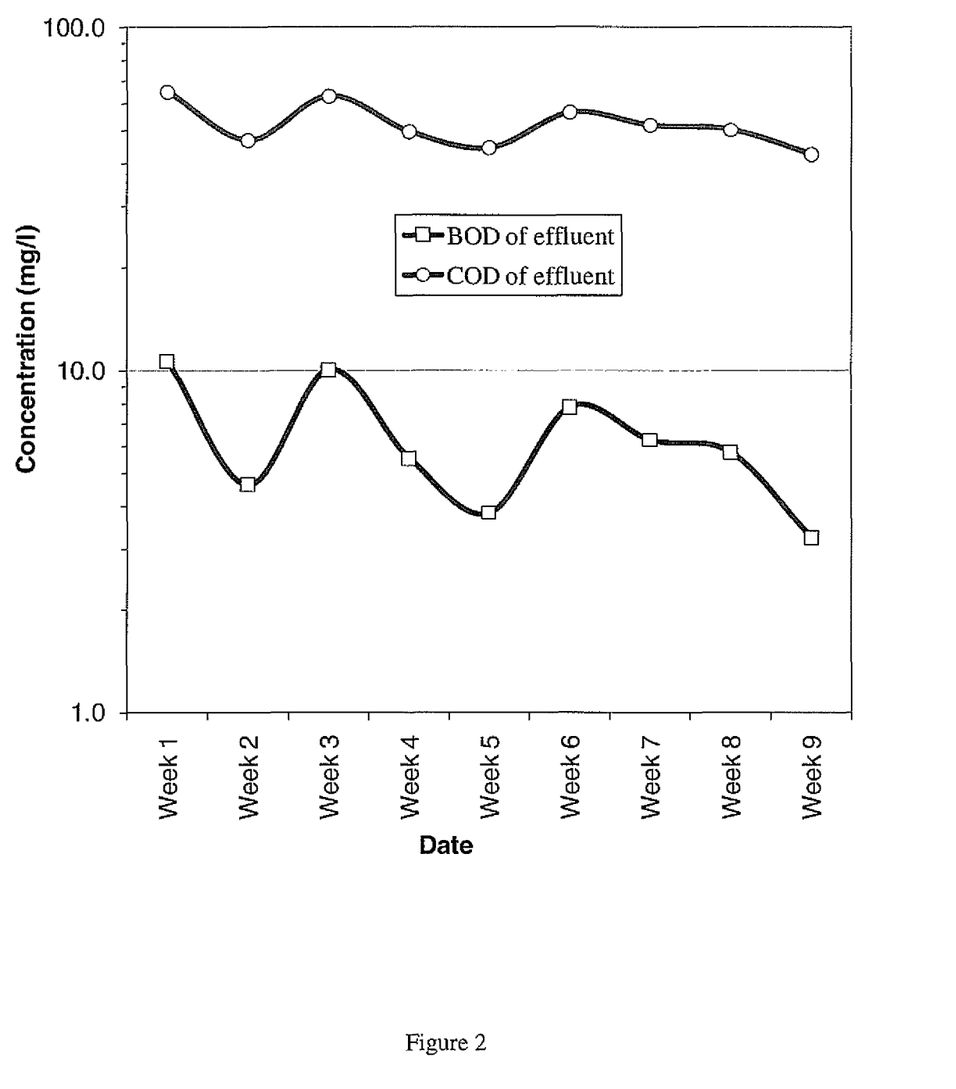
FIG. 2 shows the BOD performance of the treatment plant.
Figure 3:
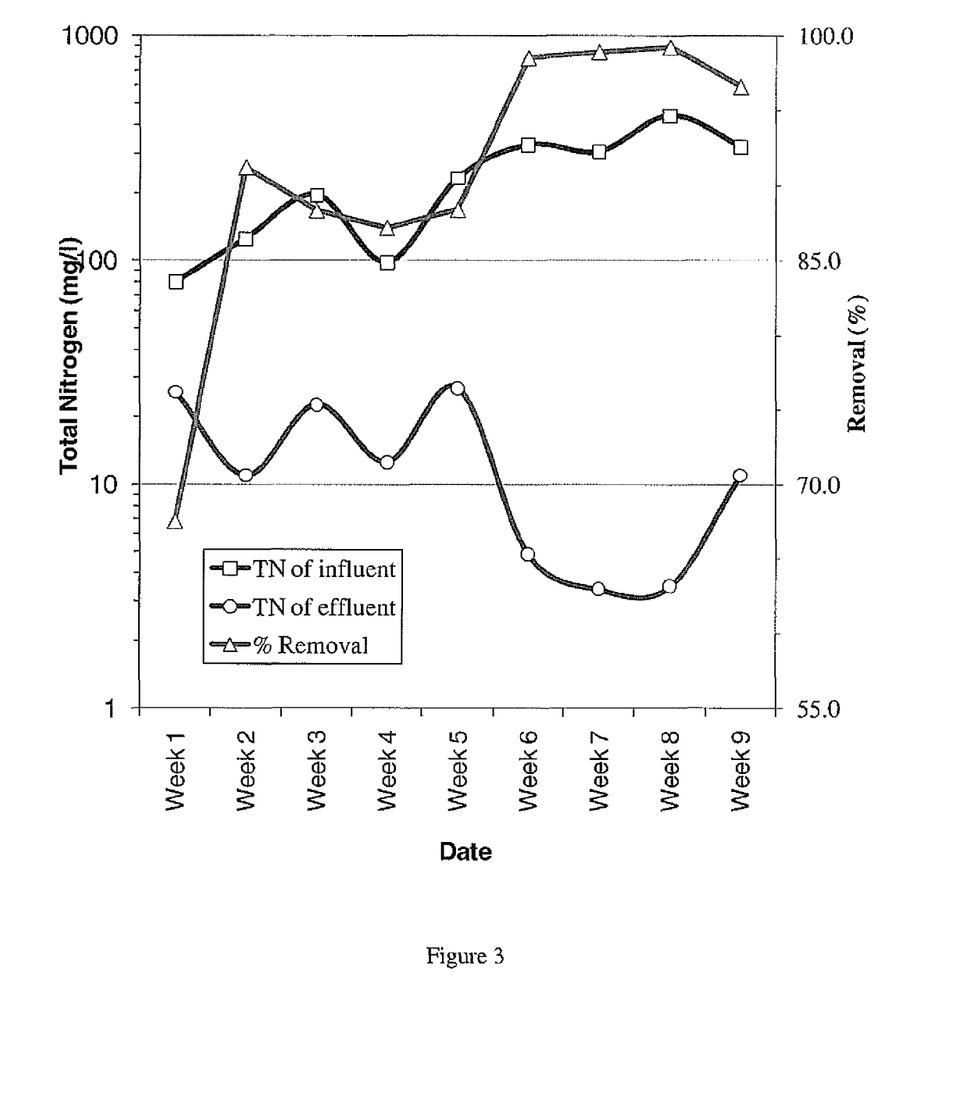
FIG. 3 shows the total nitrogen performance of the treatment plant.
Figure 4:
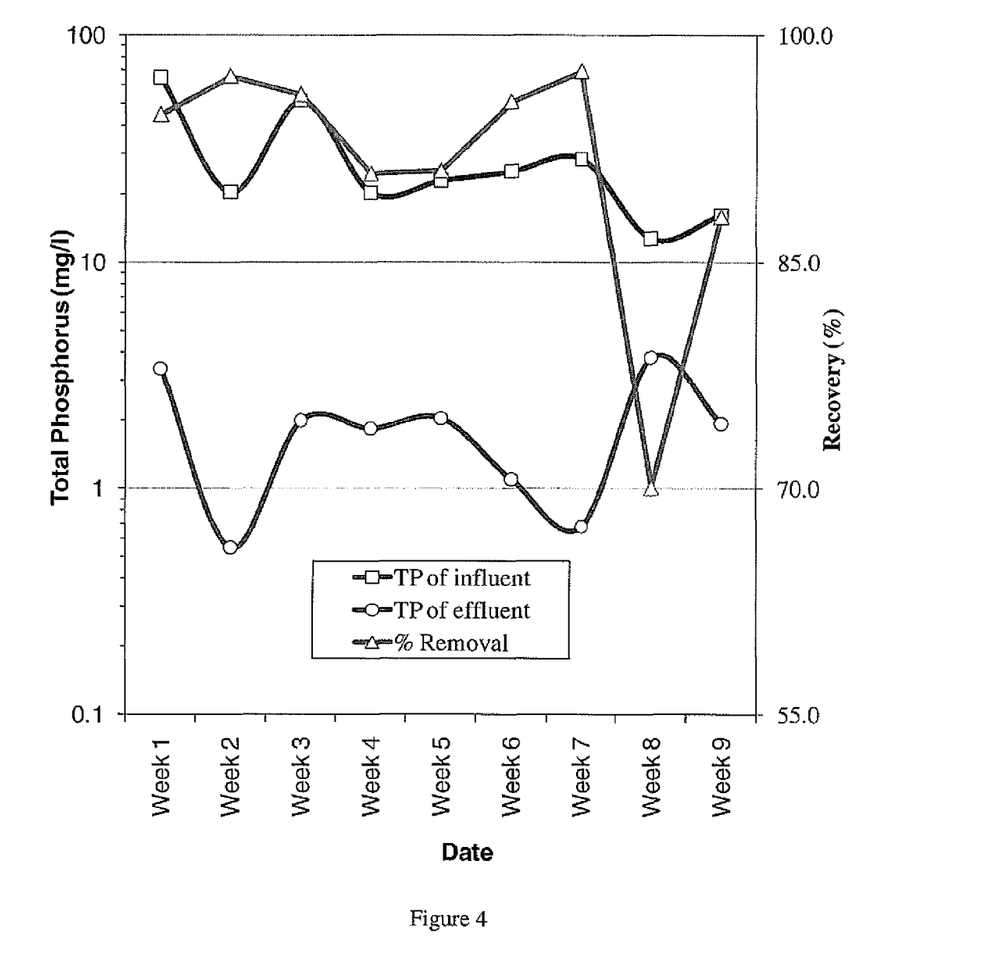
FIG. 4 shows the total phosphorus performance of the treatment plant.

A few days before the start of the survey, the operation of the plant was improved by adjusting the values of the DO concentrations (by adjusting the positions of the aeration control valves) in the contact tanks and in the aeration zones and increasing the frequency of their manual adjustment. As can be seen from the results, this led to a trend in which the performance of the plant improved over the duration of the survey.

FIG. 2 shows the COD values (measured using the dichromate method) and the BOD values of the treated effluent. The COD measurements have low values, compared with values obtained from wastewater treatment works treating such strong wastewaters, and show the trend of increasing performance improvement. For expediency, values of $BOD_5$ (for which the analytical procedure is protracted) were estimated from the measured COD values using the following predetermined formula:

$$BOD_5 = (COD - 33)/3.0.$$

On this basis, the $BOD_5$ of the treated effluent was generally less than 10 mg/l and, in the latter part of the survey (when improved operation took effect) averaged only 7 mg/l. Removal of $BOD_5$ from the wastewater was greater than 99%, demonstrating a very high performance.

FIG. 3 shows that, during the latter part of the survey, the treatment plant reduced the TN concentration of the wastewater from around 300 mg/l to less than 10 mg/l, giving removals higher than 95%. FIG. 4 shows that the TP concentrations of the treated effluent were generally less than 3 mg/l, giving removals greater than 85%.

The performance obtained from the treatment plant was exceptionally high particularly during the latter part of the survey, demonstrating the high efficacy of the treatment as described in this invention.

A skilled person could design a conventional activated sludge plant to treat the abattoir wastewater to a similar standard, although it is unlikely that such a plant (without the assistance of tertiary treatment) could produce a treated effluent with a quality as high as that obtained from the plant described above.

An activated sludge plant design to remove carbonaceous material and nutrients (TN and TP) from the abattoir wastewater would require a series of biological reactors and a sedimentation tank. The biological reactors would comprise an anaerobic reactor (operating with no aeration), an anoxic reactor (operating with no or little aeration) and an aerobic reactor (generally operating at DO concentrations of 2 mg/l or greater). The skilled person would determine that the required combined volume of the three types of reactors in the activated sludge plant would be at least three greater than the volume of the aeration tank used in treatment plant described above.

Thus, compared with a conventional activated sludge plant, the treatment plant described above is likely to give a superior performance whilst requiring much smaller reactors. The high efficacy of the overall treatment is due to the presence of the contact step in combination with the operating conditions promoting the growth, survival and recycling of endospores and endospore-forming bacteria in the contact step and in the aeration step as described in this invention.

The invention claimed is:

1. A process for treating wastewater comprising:
   a. a contact step, wherein wastewater contacts bacteria retained on a support surface and the dissolved oxygen concentration of the wastewater is maintained at 1.0 mg/l or less, wherein the wastewater is maintained at the dissolved oxygen concentration by control of the supply of the oxygen to the wastewater;
   b. an aeration step, wherein gas is passed through wastewater that has passed through the contact step and the dissolved oxygen concentration of the wastewater is reduced as the wastewater passes through the aeration step;
   c. a sedimentation step, wherein wastewater that has passed through the aeration step is substantially separated into treated water and sludge; and
   d. a sludge recycling step, wherein sludge from the sedimentation step is continuously passed to the contact step.

2. A process as claimed in claim 1, wherein the dissolved oxygen concentration of wastewater in the contact step is maintained at from 0.2 to 1.0 mg/l.

3. A process as claimed in claim 1, wherein the dissolved oxygen concentration of wastewater in the contact step is maintained at a range of from 0.5 to 1.0 mg/l.

4. A process as claimed in claim 1, wherein the dissolved oxygen concentration of wastewater towards the beginning of the wastewater's passage through the aeration step encourages growth and development of bacteria, and a reduced concentration of nutrients and the controlled dissolved oxygen concentration of wastewater towards the end of the wastewater's passage through the aeration step encourage sporulation of the bacteria.

5. A process as claimed in claim 1, wherein the dissolved oxygen concentration of wastewater towards the beginning of the aeration step is in the range of from 0.5 to 1.0 mg/l.

6. A process as claimed in claim 1, wherein the dissolved oxygen concentration of wastewater towards the end of the aeration step is in the range of from 0 to 0.3 mg/l.

7. A process as claimed in claim 1, wherein the wastewater takes at least 4 hours to pass through the aeration step.

8. A process as claimed in claim 1, wherein the dissolved oxygen concentration of the wastewater continuously reduces as it passes through the aeration step.

9. A process as claimed in claim 8, wherein control of supply of oxygen comprises a monitoring step in which the dissolved oxygen concentration of the wastewater is measured and compared against the desired concentration, and a feedback step in which the means of delivering the oxygen to the wastewater is controlled in order to increase or decrease the supply of oxygen to the wastewater so as to arrive at the desired dissolved oxygen concentration of wastewater.

10. A process as claimed in claim 1, wherein the supply of oxygen to the wastewater is varied in order to maintain the wastewater at the recited dissolved oxygen concentrations.

11. A process as claimed in claim 1, wherein the bacteria is a spore forming Bacteria.

12. A process as claimed in claim 11, wherein the bacteria is from at least one of *Bacillus* and *Clostridium* genera.

13. A process as claimed in claim 12, wherein the bacteria is *B. subtilis, B. vallismortis, B. amyloliquefaciens, B. licheniformis* and *B. megaterium*, or any combination thereof.

14. A process as claimed in claim 1, wherein the bacteria is a mutant or variant of at least one of *Bacillus* and *Clostridium* genera and is capable of forming spores and of breaking down molecules that comprise nitrogen, carbon, sulphur, chlorine and/or phosphorous.

15. A process as claimed in claim 1, wherein the bacteria are mixed species populations.

16. A process as claimed in claim 1, wherein the sludge forms a blanket in the sedimentation tank and the blanket depth is maintained at 1 m or above.

17. A process as claimed in claim 1, wherein the sludge forms a blanket in the sedimentation tank and the sludge retained within the blanket clears from the sedimentation tank with a downward velocity of from 0.3-1.5 m/h.

18. A process as claimed in claim 1, wherein the sludge is retained in the sedimentation tank for 1 hour or more.

19. A process as claimed in claim 1, wherein the support surface is a reticulated structure with a void that makes up more than 95% of the reticulated surface's total volume.

20. A process as claimed in claim 1, wherein the support surface comprises any one or more of the following synthetic polymers:-polypropylene, polyester, polyurethane, polyether-polyurethane, polyvinyl chloride, polyvinylidene chloride and polyvinylidene fluoride, or any combination thereof.

21. A unit for treating wastewater, wherein the unit comprises:—
   (a) a contact tank, which includes a support surface on which bacteria are retained and that is positioned so as to come into contact with wastewater retained in the contact tank;
   (b) an aeration tank that includes means for passing gas through wastewater retained within the aeration tank;
   (c) a conduit provided between the contact tank and aeration tank and through which wastewater can pass from the contact tank to the aeration tank;
   (d) a sedimentation tank;
   (e) a conduit provided between the aeration tank and the sedimentation tank and through which wastewater can pass from the aeration tank to the sedimentation tank;
   (f) a conduit provided between the sedimentation tank and the contact tank and through which sediment can pass continuously from the sedimentation tank to the contact tank; and
   (g) a wastewater dissolved oxygen concentration control means capable of maintaining the dissolved concentration of wastewater retained in the contact tank at 1.0 mg/l or less and capable of reducing the dissolved oxygen concentration of wastewater as it passes through the aeration tank or tanks.

22. A process as claimed in claim 14, wherein the bacteria is a mutant or variant of *Bacillus* genera and is selected from the group consisting of *B. subtilis, B. vallismortis, B. amyloliquefaciens, B. licheniformis* and *B. megaterium*, or any combination thereof.

* * * * *